United States Patent
Kononchuk et al.

(10) Patent No.: US 6,352,071 B1
(45) Date of Patent: Mar. 5, 2002

(54) APPARATUS AND METHOD FOR REDUCING BOW AND WARP IN SILICON WAFERS SLICED BY A WIRE SAW

(75) Inventors: Oleg V. Kononchuk, Brush Prairie; George Preece, Vancouver, both of WA (US)

(73) Assignee: SEH America, Inc., Vancouver, WA (US)

( * ) Notice: Subject to any disclaimer, the term of this patent is extended or adjusted under 35 U.S.C. 154(b) by 25 days.

(21) Appl. No.: 09/597,202

(22) Filed: Jun. 20, 2000

(51) Int. Cl.⁷ .................................................. B28D 1/08
(52) U.S. Cl. ..................... 125/16.02; 451/164
(58) Field of Search ............... 125/16.02, 21, 125/16.01; 451/164

(56) References Cited

U.S. PATENT DOCUMENTS

| | | |
|---|---|---|
| 4,655,191 A | 4/1987 | Wells et al. |
| 5,269,285 A | 12/1993 | Toyama et al. |
| 5,377,568 A | 1/1995 | Hauser |
| 5,575,189 A * | 11/1996 | Kiuchi et al. ............ 125/16.02 |
| 5,616,065 A | 4/1997 | Egglhuber |
| 5,810,643 A | 9/1998 | Toyama |
| 5,910,203 A | 6/1999 | Hauser |

* cited by examiner

Primary Examiner—Robert A. Rose
(74) Attorney, Agent, or Firm—Douglas G. Anderson

(57) ABSTRACT

A wire saw slicing apparatus capable of slicing a cylindrical workpiece into wafers having a flat shape with reduced bow and warp. The slicing apparatus includes a layer of parallel wires moving with reciprocating or continuous movement while a workpiece is advanced through the wires, while an abrasive containing slurry is supplied. The parallel wires are wound around wire guides, wherein the outer sleeve of the wire guide has a higher thermal coefficient of expansion, and the substructure of the wire guide has a lower thermal coefficient of expansion, with the substructure having flanges at the axial ends that restrict the outer sleeve from expanding axially.

16 Claims, 2 Drawing Sheets

APPARATUS AND METHOD FOR REDUCING BOW AND WARP IN SILICON WAFERS SLICED BY A WIRE SAW

FIELD OF THE INVENTION

The present invention relates to a wire saw slicing apparatus and a slicing method for slicing a workpiece, such as a silicon semiconductor single crystal ingot, into wafers with low warp.

BACKGROUND OF THE INVENTION

Wire saws are used to slice cylindrical workpieces, such as silicon crystal ingots, into a plurality of wafers. The wire saw provides many parallel lines of wire that are evenly spaced apart, and an abrasive-containing fluid is continuously supplied to the point of contact with the workpiece. The wire is then continuously rotated, or more commonly reciprocated, across the workpiece, thereby slicing the workpiece into wafers using a grinding technique. The workpiece is advanced through the wires as the slicing progresses at a controlled rate to help provide a uniform slice without kerf variations on the surface of the wafers.

The wires are tensioned between several wire guides that are parallel to each other. The wire guides are made of metal, and typically have an outer sleeve that is made of synthetic material such as polyurethane. The outer surface of the synthetic sleeve is manufactured with grooves that precisely position where the wire seats, thereby controlling the axial distance between the wires, and thus the thickness of the wafers being sliced. As slicing is performed, the synthetic sleeve surface is degraded and worn away by the wire and abrasive, and must be resurfaced or replaced on a periodic basis. Various methods exist, and are well known in the art, of attaching the outer sleeve of the wire guide to the metal substructure, including overlaying techniques, gluing, mechanical attachments such as bolts or screws, and molding techniques. Similarly, well known methods exist for resurfacing the outer sleeve including placing resurfacing tools inside the slicing machine, removing and retooling the outer sleeve only while leaving the metal substructure in place, and removing the entire wire guide to resurface the outer sleeve.

Each wire guide has one or more sets of bearings that support the wire guide, and allow it to rotate around its longitudinal axis as the wire advances or reciprocates on its surface. The bearings supporting the wire guide experience friction from the rotation of the wire guide, and the friction is increased by wire wound around the wire guides and placed in tension. As the slicing process begins, the bearings are at one temperature, and as the slicing progresses, the temperature of the bearings will increase by significant amounts. This added temperature is passed from the bearings to the metal substructure, and on to the polyurethane outer sleeve.

The production of semiconductor wafers, such as silicon wafers, requires very tight process control for a wire saw. The desired outcome of the slicing process is to produce a plurality of wafers, all of which are the same thickness to within several microns, and have front and back surfaces that are as flat, smooth, and parallel to one another as possible. Unfortunately, however, wafers deviate from the desired surface outcome. Often wafer surfaces exhibit bow, the deviation of the center point of a wafer from a selected plane, or warp, the sum of the deviations of the highest and lowest points on the wafer surface from the same selected plane. The surface deformations of bow and warp cannot be removed in later processes such as lapping or surface grinding, because the wafer undergoes elastic deformation from the forces exerted on the wafer in those processes. Therefore, it is critical to control and minimize bow and warp in the slicing process.

It is well known in the art that warp and bow are generated due to variations of pitch of the wire wound around the wire guides. These variations of pitch are caused by thermal expansion of the main wire guides caused by frictional heat generated during the slicing process, both from the bearings supporting the metal substructure of the wire guide and the interaction between the wire and the synthetic outer sleeve. For example, the thermal coefficient of expansion for steel is approximately $6.0*10^{-6}$ in/in° F. Likewise, the thermal coefficient of expansion for polyurethane is approximately $9*10^{-5}$ in/in° F. Current manufacturing methods slice crystal ingots of lengths up to 1000 mm in length. If, then the temperature of the outer synthetic sleeve raises a mere 100° F. due to friction, the expansion would be approximately 9 mm. Using a wire thickness of 200 microns, and a wafer thickness of 800 microns, each wire guide groove would experience expansion of approximately 9 microns. In view of the progressive miniaturization of electronic circuitry, this 9 microns of expansion per wire groove is significant to the acceptable bow and warp measurements of a wafer.

To address the problem of thermal expansion, various means for cooling the wire guides during slicing have been proposed. For example, U.S. Pat. No. 5,269,285 discloses a method of slicing wafers wherein the abrasive-carrying fluid applied to the wires is also flushed through the bearings of the wire guides and acts as a coolant for the bearings. The system provides temperature sensors for the working fluid coming from the slicing interface and from the bearings independently, and heat exchangers for controlling the temperatures of each. This technology can reduce thermal variations, but cannot eliminate them completely. Further, the apparatus is somewhat cumbersome and both equipment and space intensive.

U.S. Pat. No. 5,377,568 discloses an improvement that includes a thread guide detection system with cooling fluid. The cooling fluid flows through the center of the wire guide. The detection system measures the position of thread guide at one end, and as movement is detected at the end of the thread guide due to thermal expansion or contraction, the temperature of the cooling fluid is changed to offset the change in temperature. The obvious disadvantage of this system, however, lies in the fact that the detection system can only monitor the movement at one precise position, and cannot compensate for expansion or contraction along the length of the wire guide.

U.S. Pat. No. 5,616,065 provides a method of monitoring the location of the workpiece to be sliced, and a means of compensating the workpiece to move into the proper location. The apparatus, however, is very complex, and requires the use of many interrelated parts to monitor and adjust crystal placement. Further, the material forming the wire guide outer sleeve is described to have a coefficient of thermal expansion of $\leq 1.0*10^{-6}$ in/in° F., and preferably $\leq 0.1*10^{-6}$ in/in° F., such as glass-ceramic materials. Although these materials have a very small coefficient of thermal expansion, these materials are expensive to manufacture and re-work compared to synthetic materials, and cause increased stresses on the wire, leading to earlier wire failure.

U.S. Pat. No. 5,810,643 provides a method of controlling wafer surface by coordinating a cyclical workpiece advancement to the wires with the cyclical reciprocation speed of the wire such that the workpiece advancement is maximized at the maximum wire reciprocation speeds, and is minimized at the inflection points between reciprocation of the wire in the two directions. This patent does not address thermal expansion of the wire guides, however.

Finally, U.S. Pat. No. 5,910,203 discloses a removable outer sleeve of a wire guide, wherein a synthetic coating is mounted over a metal subplate, and the outer sleeve is broken into a plurality of sections that mount in unison to completely cover the wire guide. As retooling of the wire guide is needed, the sections of the outer sleeve are removed and replaced with new or newly resurfaced sections. Although the removable outer sleeve of the wire guide has a metal subplate having a low coefficient of thermal expansion, there is nothing to constrain the thermal expansion of the outer synthetic coating. Since the synthetic coating has a large coefficient of thermal expansion, the workpiece will experience bow and warp as the temperature of the synthetic coating varies during slicing.

In order to meet the increasing tighter specifications of the electronics industry, bow and warp must be reduced as much as possible in the slicing of the workpieces. Many efforts have been made to address the movement of the workpiece to be sliced, and the thermal expansion of the wire-guiding equipment used to control the process, with limited success.

SUMMARY OF THE INVENTION

The present invention addresses these and other shortcomings of the prior art by providing a wire saw slicing apparatus capable of slicing a workpiece, such as a silicon semiconductor single crystal ingot, into wafers having a uniform shape with minimal bow and warp. According to one embodiment, a wire guide is provided that has a cylindrical substructure having a first coefficient of thermal expansion and comprised of a body and a pair of flanges proximate the opposed ends of the body. The wire guide of this advantageous embodiment also includes and outer sleeve mounted upon the substrate and having a second coefficient of thermal expansion that is greater than the first coefficient of thermal expansion of the structure. By mounting the outer sleeve upon the substructure such that the outer sleeve lies between the flanges, however, the thermal expansion of the outer sleeve is constrained by the flanges, thereby reducing the variation of pitch of the wire wound around the wire guides so as to correspondingly reduce the bow and warp of the resulting wafers.

One aspect of the present invention provides a wire saw slicing apparatus containing a plurality of parallel, regularly spaced lines of wire which reciprocate while a workpiece is advanced through the wires, and a slurry abrasive is supplied at the interface of the workpiece and wires. The wire saw slicing apparatus of this embodiment comprises: (a) means for feeding one of the workpiece and the wire relative to each other along a linear path to force them together, (b) means for reciprocating the wire in an axial direction, (c) means for rotating the wire around a plurality of wire guides, and (d) means, such as flanges extending outwardly from the body of the wire guides, for restricting the axial expansion of the wire guides.

In a second preferred form of the present invention there is provided a wire saw slicing apparatus containing a plurality of parallel, regularly spaced lines of wire which reciprocate while a workpiece is advanced through the wires, and a slurry abrasive is supplied at the interface of the workpiece and wires, which comprises: (a) means for feeding one of the workpiece and the wire relative to each other along a linear path to force them together, (b) means for reciprocating the wire in an axial direction, (c) means for rotating the wire around a plurality of wire guides, (d) means, such as the outwardly extending flanges, for restricting the axial expansion of the wire guides, and (e) means for providing a coolant to load bearing and friction generating parts to assist in controlling thermal expansion.

In a third preferred form of the present invention there is provided a wire saw slicing apparatus containing a plurality of parallel, regularly spaced lines of wire which reciprocate while a workpiece is advanced through the wires, and a slurry abrasive is supplied at the interface of the workpiece and wires, which comprises: (a) means for feeding one of the workpiece and the wire relative to each other along a linear path to force them together, (b) means for reciprocating the wire in an axial direction, (c) means for rotating the wire around a plurality of wire guides, (d) means, such as the outwardly extending flanges, for restricting the axial expansion of the wire guides, (e) means for monitoring precise location of the workpiece relative to the wire, and (f) means to adjust the location of the workpiece relative to the wire, dependent upon thermal expansion.

In a fourth preferred form of the present invention there is provided a wire saw slicing apparatus containing a plurality of parallel, regularly spaced lines of wire which reciprocate while a workpiece is advanced through the wires, and a slurry abrasive is supplied at the interface of the workpiece and wires, which comprises: (a) means for feeding one of the workpiece and the wire relative to each other along a linear path to force them together, (b) means for reciprocating the wire in an axial direction, (c) means for rotating the wire around a plurality of wire guides, (d) means, such as the outwardly extending flanges, for restricting the axial expansion of the wire guides, (e) means for monitoring precise location of the workpiece relative to the wire, (f) means to adjust the location of the workpiece relative to the wire dependent upon thermal expansion, and (g) a means for providing a coolant to load bearing and friction generating parts to assist in controlling thermal expansion.

By bounding the axial ends of the synthetic outer sleeve of the wire guide with flanges that extend outwardly from the body of a cylindrical substructure, either alone or in conjunction with temperature control units and/or position sensing and adjustment units, the expansion of the outer sleeve can be substantially reduced which can, in turn, significantly improve the uniformity of the surface of sliced workpieces, thereby reducing bow and warp.

The above and other objects, features, and advantages of the present invention will become manifest to those skilled in the art upon reference to the detailed description and accompanying drawings shown by way of illustrative example.

DETAILED DESCRIPTION OF THE INVENTION

Figure 1:
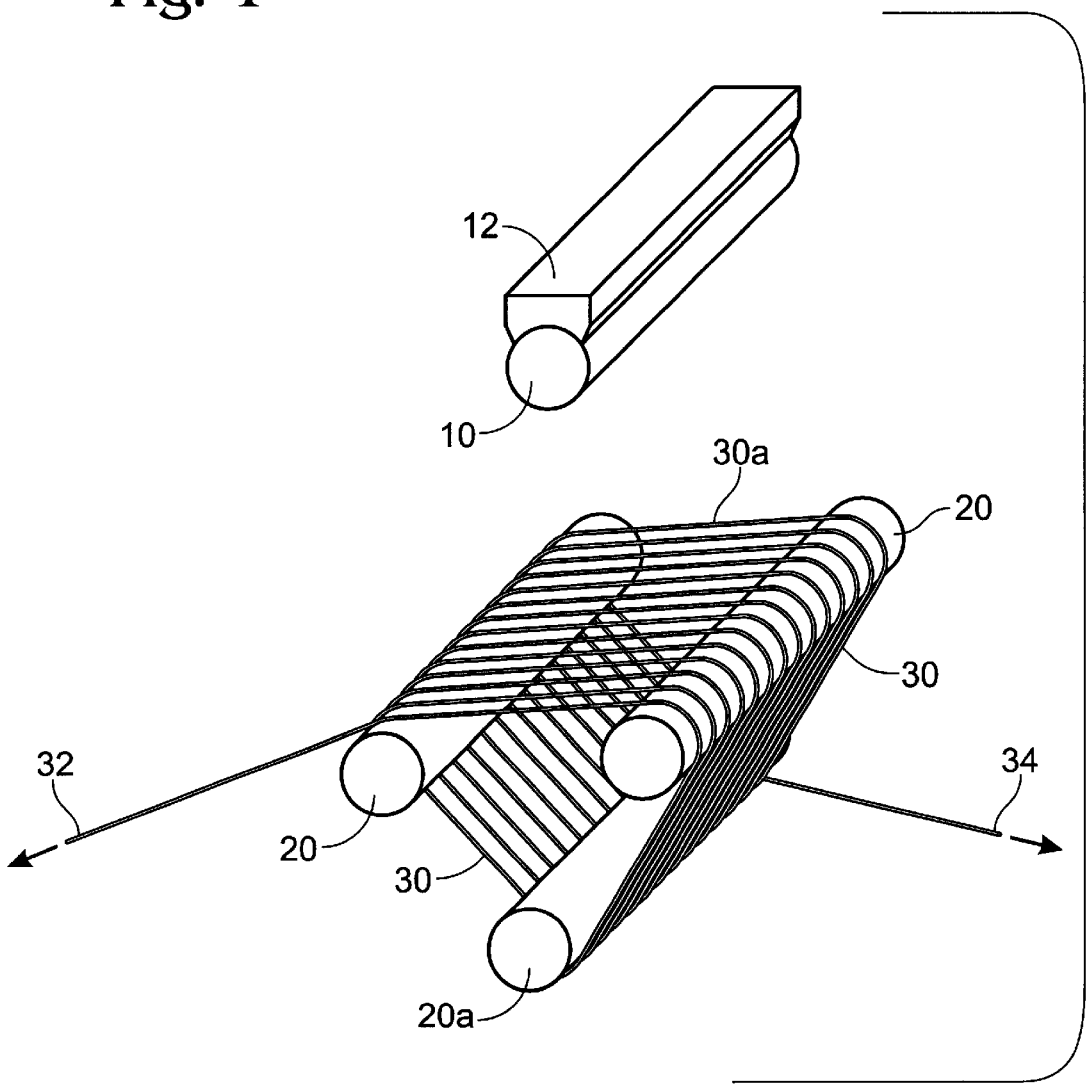
FIG. 1 is a diagrammatic representation of a roller system having three wire guide rollers.

Turning now in detail to the drawings, the wire guide system shown in FIG. 1 comprises three wire guides 20, around which a finite wire 30 is coiled.

Wire is fed to the wire guides 20 from a feed coil (not shown) with new wire, shown at 32. The finite wire is then wound around the wire guides 20 at controlled locations such that the finite wire 30 forms a plurality of parallel wires that provide the slicing plane. The finite wire 30 is fed and reciprocated at a 2:1 ratio, such that the finite wire 30 advances 2 units of distance, is recoiled 1 unit of distance, and repeated. The used finite wire 30 is wound around a tale-up spool (not shown) with the used finite wire 30 exiting the wire guides 20 shown at 34. One of the wire guides, designated as 20a is driven by a motor (not shown) to advance the finite wire 30. The other wire guides 20 are not driven.

A semiconductor ingot 10 is attached to a mounting block 12. The mounting block 12 is then attached to a feed mechanism (not shown) wherein the feed mechanism advances the ingot 10 to the portion of the wire web 30 designated 30a. A slurry, containing an abrasive, is supplied to the wire web 30, and the reciprocation of the wire web 30 combined with the slurry containing abrasive cut through the ingot 10.

Figure 2:
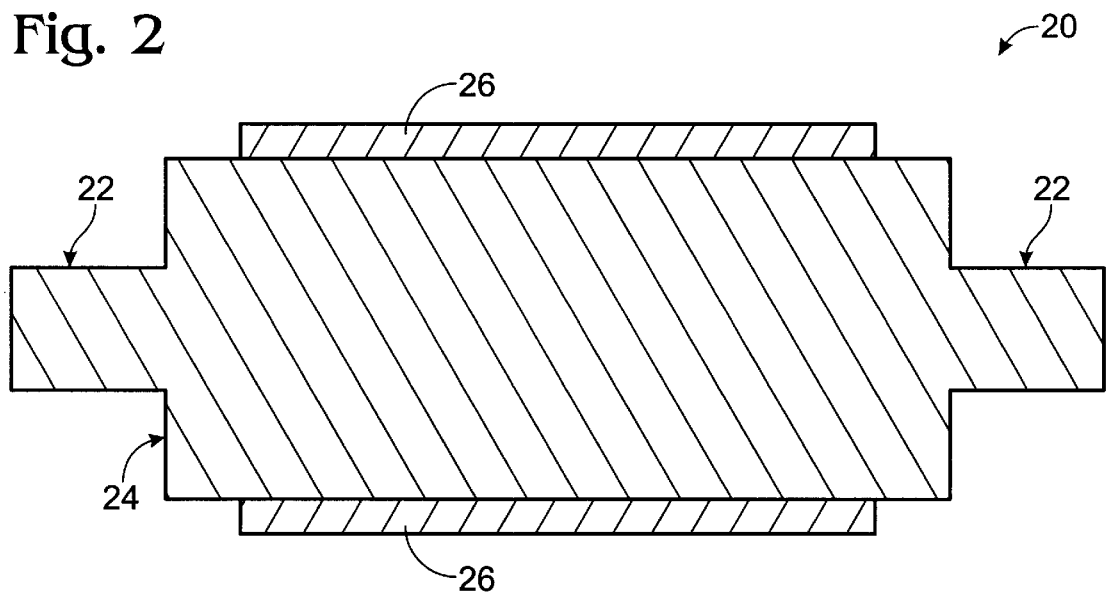
FIG. 2 is a cut-away side view of a typical prior-art wire guide.

Turning now to FIG. 2, a cross section of a wire guide 20 used in the art is shown. Wire guide 20 has a substructure 24. The substructure 24 is typically made out of metal, is cylindrical, and has two bearing seats 22 on each axial end. The bearing seats 22 interact with bearings (not shown) to allow for smooth rotation during operation. A section of the cylindrical substructure 24 is covered with an outer sleeve 26, which is typically made of a synthetic material, such as polyurethane or other suitable plastic. The outer sleeve 26 has a plurality of shallow and precisely placed grooves (not shown) milled into the outer surface to control and guide the wire web 30 in such a manner that the wire web 30 remains parallel and maintains the desired spacing.

Figure 3:
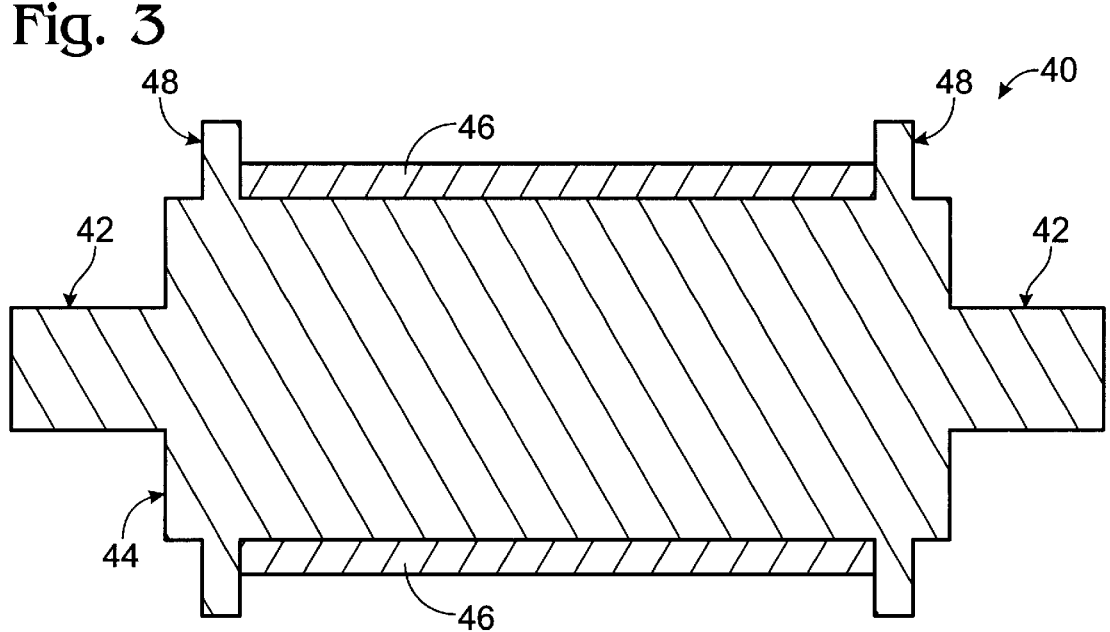
FIG. 3 is a cut-away side view of an embodiment of the present invention.

FIG. 3 demonstrates a wire guide of the present invention. In a preferred embodiment of the present invention, there is a substructure 44 that is made of metal, and has appropriate bearing seats 42 on each axial end. The substructure is made of metal, and has a coefficient of thermal expansion of less than $1*10^{-6\circ}$ F.$^{-1}$. A section of the substructure 44 is covered with a outer sleeve 46. The outer sleeve is preferably synthetic, such as polyurethane or equivalent, and has a thermal coefficient of expansion of greater than $1*10^{-1\circ}$ F.$^{-1}$, and can have a coefficient of thermal expansion of greater than $1*10^{-5\circ}$ F.$^{-1}$. The substructure 44 has two flanges 48 located on the proximal ends of the substructure 44, that encase the axial ends of the outer sleeve 46, thereby inhibiting axial expansion of the outer sleeve 46 to the thermal expansion of the substructure 44. The flanges 48 extend outwardly by a distance at least as great as the thickness of the outer sleeve 46. The axial expansion of the outer sleeve 46 will then be reduced by an order of magnitude, to that of the substructure since the substructure will expand less than the outer sleeve if the outer sleeve is left unrestrained. It is preferred that the flanges 48 be milled into the substructure 44, but the flanges can also be manufactured separately and rigidly attached to the substructure 44 by use of screws, brads, or other securing means. Regardless of the manner in which the flanges are formed, the reduction in the axial expansion of the outer sleeve provided according to the present invention correspondingly reduces the variation of pitch of the wire wound around the wire guides, thereby reducing the resulting bow and warp of the wafers.

In another embodiment of the present invention, wire guides 40 utilizing flanges 48 are used in conjunction with a sensor (not shown) to detect the position of the ingot 10, and to determine the exact location of the ingot 10 with respect to the wire web 30. The information provided by a sensor is used to control a motor (not shown) which places the ingot 10 and the wire web 30a in the desired location relative to each other by moving the ingot 10, the wire web 30, or both. This sensor and motor system can also be used to control and correct relative positioning of the wire web 30 and ingot 10 as thermal expansion of the wire guides 20 occurs due to frictional forces. Various sensor and positioning control units are known in the art, and are sufficient for use.

In yet another embodiment of the present invention, wire guides 40 utilizing flanges 48 are used in conjunction with a temperature sensor (not shown) in the bearings on which the wire guides 20 rotate. In this embodiment, a cooling fluid can be controllably passed over the bearings to maintain thermal stability. If so desired, the cooling fluid can also be passed through the center of the wire guides to further accommodate thermal variations. A number of commercially available cooling units are well known in the art, and can be utilized.

Another embodiment of the present invention utilizes wire guides 40 containing flanges 48, a position sensor and positioning motor to adjust for thermal expansion of the substructure 44, and a heat exchanger with coolant flushed over the bearings and/or through the center of substructure 44 to inhibit thermal expansion of the substructure 44.

While several embodiments of the present invention have been shown and described, it is to be understood that many changes and modifications may be made thereunto without departing from the spirit and scope of the invention as defined in the appended claims.

What is claimed is:

1. A wire guide for a wire saw used for slicing cylindrical workpieces, comprising:

a cylindrical substructure capable of being engaged by a wire saw drive mechanism and rotatable around an axis, said substructure having a first thermal coefficient of expansion, and said substructure having a body and flanges at each proximal end of the body having a greater diameter than the cylindrical body of said substructure; and an outer sleeve attached to said substructure having an outer diameter, said outer sleeve having a second thermal coefficient of expansion greater than the thermal coefficient of expansion of said substructure, wherein said outer sleeve is bounded on each proximal end by the flanges of said substructure such that axial thermal expansion of said outer sleeve is constrained by the flanges of said substructure, and wherein the flanges of said substructure have a diameter equal to or larger than the outer diameter of said outer sleeve.

2. A wire guide as claimed in claim 1, wherein said outer sleeve is a synthetic sleeve.

3. A wire guide as claimed in claim 1, wherein the first thermal coefficient of thermal expansion of said substructure is $<1.0*10^{-6\circ}$ F.$^{-1}$, and wherein the second coefficient of thermal expansion of said outer sleeve is $\geq 1.0*10^{-6\circ}$ F.$^{-1}$.

4. A wire guides as claimed in claim 3, wherein the second thermal coefficient of expansion of said outer sleeve is $\geq 1.0*10^{-5\circ}$ F.$^{-1}$.

5. A wire saw for slicing cylindrical workpieces comprising:

a machine frame;

a feed device, comprising a plurality of wire guides which are mounted to said machine frame by bearings such that said wire guides can rotate around respective longitudinal axes, wherein at least one wire guide is driven, and wherein said feed device further comprises at least one wire web comprising a plurality of wires disposed in parallel between said wire guides to form cutting planes; and a guidance system for guidance of the wire web into the desired cutting planes, said guidance system having at least one measuring device and one controlling device, wherein said wire guides have outer sleeves with an outer diameter and a first coefficient of thermal expansion, and cylindrical substructures upon which respective outer sleeves are mounted that have a second coefficient of expansion that is less than the first coefficient of said outer sleeves, wherein each cylindrical substructure has flanges at each proximal end having a diameter at least as large as the outer diameter of said outer sleeve such that the outer sleeve is constrained by said flanges and axial thermal expansion of said outer sleeve is inhibited by said flanges of the cylindrical substructure.

6. The wire saw as claimed in claim 5, wherein said outer sleeve is a synthetic sleeve.

7. The wire saw as claimed in claim 5, wherein the said second thermal coefficient of thermal expansion of said substructure is $<1.0*10^{-6}$ $F.^{-1}$, and wherein the first coefficient of thermal expansion of said outer sleeve is $\geq 1.0*10^{-6}$ $F.^{-1}$.

8. The wire saw as claimed in claim 7, wherein said outer sleeve has a first coefficient of thermal expansion $\geq 1.0*10^{-5}$ $F.^{-1}$.

9. A wire saw for slicing cylindrical workpieces comprising:

a machine frame;

a feed device comprising a plurality of wire guides which are mounted to machine frame by bearings such that said wire guides can rotate around respective longitudinal axes, wherein at least one wire guide is driven, and wherein said feed device further comprises at least one wire web comprising a plurality of wires in parallel between said wire guides to form cutting planes;

a guidance system for guidance of at least one of the cylindrical workpieces and the wire web into the desired cutting planes, said guidance device having at least one measuring device and one controlling device; and a cooling system, having a coolant liquid flushed over the bearings of said feed device to control heat transfer and thermal expansion of said wire guides, said cooling system further comprising a temperature sensing device and a temperature controlling device;

wherein said wire guides have outer sleeves with an outer diameter and a first coefficient of thermal expansion, and cylindrical substructures upon which respective outer sleeves are mounted that have a second coefficient of thermal expansion that is less than the first coefficient of thermal expansion of said out sleeves, wherein each substructure has flanges at each proximal end having a diameter at least as large as the outer diameter of said outer sleeve such that the outer sleeve is constrained by said flanges and axial thermal expansion of said outer sleeve is inhibited by said flanges of the cylindrical substructure.

10. The wire saw as claimed in claim 9, wherein said outer sleeve is a synthetic sleeve.

11. The wire saw as claimed in claim 9, wherein the second thermal coefficient of thermal expansion of said substructure is $<1.0*10^{-6}$ $F.^{-1}$, and wherein the first coefficient of thermal expansion of said outer sleeve is $\geq 1.0*10^{-6}$ $F.^{-1}$.

12. The wire saw as claimed in claim 11, wherein said outer sleeve has a first coefficient of thermal expansion $\geq 1.0*10^{-5}$ $F.^{-1}$.

13. A wire saw for slicing cylindrical workpieces comprising:

a machine frame;

a feed device comprising a plurality of wire guides which are mounted to said machine frame by bearings such that said wire guides can rotate around respective longitudinal axes, wherein at least one wire guide is driven, and wherein said feed device further comprises at least one wire web comprising a plurality of wires disposed in parallel between said wire guides to form cutting planes; and a cooling system, having a coolant liquid flushed over the bearings of said feed device to control heat transfer and thermal expansion of said wire guides, said cooling system further comprising a temperature sensing device and a temperature controlling device;

wherein said wire guides have outer sleeves with an outer diameter and a first coefficient of thermal expansion, and cylindrical substructures with a second coefficient of expansion that is less than the first coefficient of thermal expansion of said outer sleeves, wherein each substructure has flanges at each proximal end having a diameter at least as large as the outer diameter of said outer sleeve such that the outer sleeve is constrained by said flanges and axial thermal expansion of said outer sleeve is inhibited by said flanges of the cylindrical substructure.

14. The wire saw as claimed in claim 13, wherein said outer sleeve is a synthetic sleeve.

15. The wire saw as claimed in claim 13, wherein the second coefficient of thermal expansion of said substructure is $<1.0*10^{-6}$ $F.^{-1}$, and wherein the first coefficient of thermal expansion of said outer sleeve is $\geq 1.0*10^{-6}$ $F.^{-1}$.

16. The wire saw as claimed in claim 15, wherein said outer sleeve has a first coefficient of thermal expansion $\geq 1.0*10^{-5}$ $F.^{-1}$.

* * * * *